J. L. GONARD.
CUT DIAMOND.
APPLICATION FILED MAR. 26, 1909.
946,939.
Patented Jan. 18, 1910.
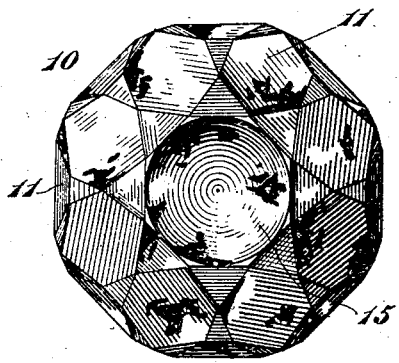
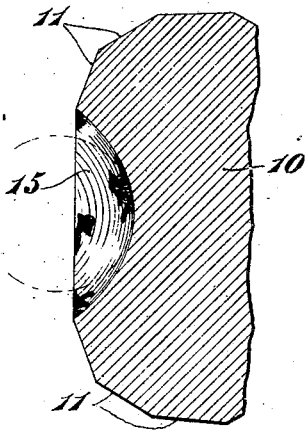
WITNESSES
INVENTOR

UNITED STATES PATENT OFFICE.

JEAN LOUIS GONARD, OF COYTESVILLE, NEW JERSEY.

CUT DIAMOND.

946,939.  Specification of Letters Patent.  Patented Jan. 18, 1910.

Application filed March 26, 1909. Serial No. 485,915.

*To all whom it may concern:*

Be it known that I, JEAN LOUIS GONARD, a citizen of the United States of America, and a resident of Coytesville, in the county of Bergen, State of New Jersey, have invented certain new and useful Improvements in Cut Diamonds, whereof the following is a specification.

This invention relates to cut diamonds and is especially applicable to diamonds known as brilliants and table diamonds.

The object of the invention is to secure increased brilliancy in the cut stone.

The invention consists in a cut diamond having a concave table or facet whereby the surface of the table or facet is increased over the plane surface heretofore used in this art and a better reflection obtained.

Figure 1 of the accompanying drawings represents a top plan view of a brilliant embodying this invention. Fig. 2 represents a diametrical section thereof.

This invention is preferably applicable to those forms of cut diamonds which have a table or enlarged facet such as brilliants and table diamonds.

In the form of embodiment of the invention illustrated in the accompanying drawings the brilliant 10, provided with usual smaller plane facets 11, has its table 15 cut in a concave instead of a plane surface. This concave table shown in the form of a hyperboloid, may be of any other suitable concavity, which enlarges the superficial surface of the table or facet and increases the reflecting surface thereof. The concave table or facet is formed by grinding with diamond dust, oil and a suitable tool.

I claim as my invention:

1. A cut diamond having a concave facet.
2. A cut diamond having symmetrically arranged facets, and a table the surface of which is in concave form.
3. A brilliant provided with symmetrical facets on its collet side, symmetrical facets on its table side and a concave table.
4. A cut diamond having a concave facet in the form of a hyperboloid.
5. A cut diamond having the usual symmetrically arranged facets and a table the surface of which is in the form of a hyperboloid.
6. A brilliant comprising upper and lower parts provided with inclined symmetrical facets and a concave table in the form of a hyperboloid.

JEAN LOUIS GONARD.

Witnesses:
F. C. SOMES,
PAUL E. JOHNSON.